United States Patent [19]
Backes et al.

[11] Patent Number: 5,018,137
[45] Date of Patent: May 21, 1991

[54] TRANSPARENT LOAD SHARING FOR PARALLEL NETWORKS

[75] Inventors: Floyd J. Backes, Temple, N.H.; George Varghese, Bradford; Charles W. Kaufman, Northboro, both of Mass.

[73] Assignee: Digital Equipment Corporation, Maynard, Mass.

[21] Appl. No.: 598,214

[22] Filed: Oct. 16, 1990

Related U.S. Application Data

[63] Continuation of Ser. No. 212,359, Jun. 27, 1988.

[51] Int. Cl.⁵ .............................. H04J 3/02; H04J 3/24
[52] U.S. Cl. ................................ 370/85.13; 370/85.14; 370/94.1
[58] Field of Search ................. 370/85.13, 85.14, 85.9, 370/94.1, 94.3, 94.2, 60, 60.1, 85.12

[56] References Cited

U.S. PATENT DOCUMENTS

| | | | |
|---|---|---|---|
| 4,587,651 | 5/1986 | Nelson et al. | 370/85.12 |
| 4,597,078 | 6/1986 | Kempf | 370/85.13 |
| 4,627,052 | 12/1986 | Hoare et al. | 370/85.13 |

Primary Examiner—Douglas W. Olms
Assistant Examiner—Wellington Chin
Attorney, Agent, or Firm—Finnegan, Henderson, Farabow, Garrett, and Dunner

[57] ABSTRACT

A method for improving communications in a bridge network between end nodes involving sensing trunking configurations and executing binding schemes to make certain daughter bridges involved in the trunking conditions behave as a plurality of bridges and forward messages in the correct time sequence. This can be done by creating "forwarding groups" associating different groups of networks connected to those daughter bridges.

13 Claims, 7 Drawing Sheets

FORWARDING
DATA BASE 380

TRANSPARENT LOAD SHARING FOR PARALLEL NETWORKS

This is a continuation of application Ser. No. 212,359 filed June 27, 1988.

BACKGROUND OF THE INVENTION

The present invention relates to the field of network management in general and specifically to the improvement of communications in a local area network containing a number of bridges.

Networks are used to interconnect sources and receivers of data. For purposes of this invention, the nature of the data sources and receivers is not important, and all of such sources and receivers will be called "end nodes." Networks provide a capability for end nodes to send messages to each other.

A basic type of is called a local area network or LAN. A LAN contains end nodes and some means for transmission between the end nodes, such as one or more wires interconnecting the nodes. In a LAN, messages between end nodes need only include a source identifier, a destination identifier, data to be transmitted, and other desired "overhead" such as network management information or error detection codes.

Sometimes networks such as LANs need to be interconnected. Such interconnection could occur if a network was to be extended or connected to dissimilar networks. Interconnection of the networks can involve the creation of a higher level network or, as long as the interconnection is not too extensive, the joining of networks at the same level.

If a higher level network is created, certain devices called "routers" must be used. Routers, however, add another layer of communication protocol and end node messages must include information to reflect the added protocol.

If networks are to be interconnected at the same level, then bridges are used to join the networks. With bridges, the end node messages need not contain additional protocol information. Ideally, bridges should be transparent to end nodes so that interconnected networks appear as one large network. An IEEE 802.1 Media Access Control Bridge Standard (Rev. E) (hereinafter "IEEE standard"), which is incorporated herein by reference, has decided that transparent bridges are to be standard for all IEEE 802 local area networks.

Basic bridge operation is explained in Backes, "Transparent Bridges for Interconnection of IEEE 802 LANs," IEEE Network, Vol. 2, No. 1, pp. 5-9 (January, 1988), which is herein incorporated by reference. Each bridge's major function is to receive messages (also called "frames") from one network connected to the bridge and to forward those messages to one or more other networks also connected to the bridge. Each bridge must therefore examine the destination addresses of the received messages. If the bridge recognizes a message's destination address as already stored in some data base inside the bridge, the bridge forwards the message to the networks indicated by that data base. If the bridge does not recognize a particular destination address, the bridge forwards the message to all of the other networks connected to it.

The bridges develop their data bases by also examining the source addresses of the messages received. When a bridge receives a message from one network, it determines that, barring other circumstances such as contradictory information, the end node specified in the source identifier may be reached via the network from which the message is received.

The network from which the message was received is called the "station address" for the source end node, and the data base is a collection of end nodes and corresponding station addresses. The station address for an end node does not indicate that the corresponding end node is on the network specified by the station address. For example, a message may have been received from a source end node on a different network, and the message may have been forwarded to the station address network by another bridge. The station address only indicates that the identified end node may be reached in the direction of the network from which the message was received.

Although bridged networks generally work quite well, their operation breaks down if there is some sort of a loop. A loop exists when two networks are connected by more than one bridge.

Loops occur either accidentally, for example because of poor bridge design, or can sometimes be designed into a network topology to provide either redundancy or backup.

In a loop situation, one of the bridges, called a first bridge, sends a message from a first network to a second network. That first bridge then records in its data base that the station address for the source of the message is the first network. When another bridge, called the second bridge, receives that forwarded message on the second network, the second bridge determines that the station address of source for the message is the second network. The second bridge then forwards the message back to the first bridge. This forwarding process will continue indefinitely without some sort of safeguard.

Figure 1:
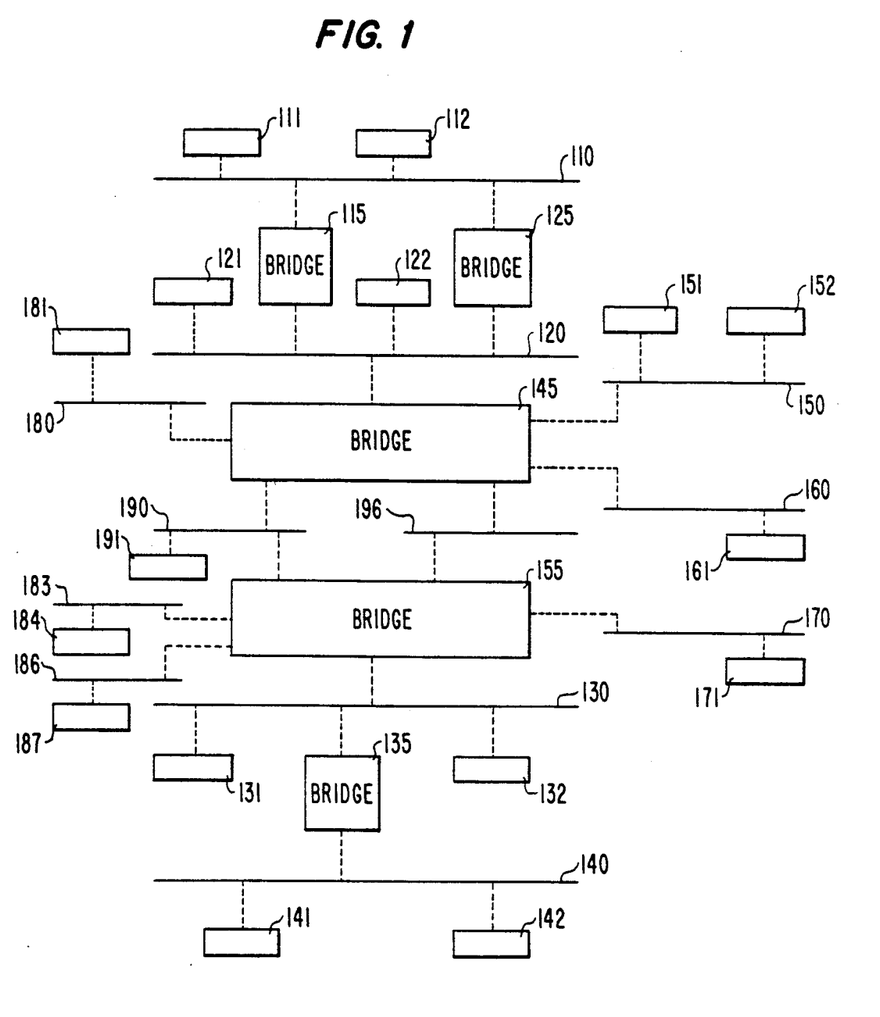
FIG. 1 shows several local area network with several end nodes and bridges.

FIG. 1 illustrates how loops occur in interconnected networks. FIG. 1 shows networks 110, 120, 130, 140, 150, 160, 170, 180, 183, 186, 190, and 196. End nodes 111 and 112 are connected to network 110; end nodes 121 and 122 are connected to network 120; end nodes 131 and 132 are connected to network 130; end nodes 141 and 142 are connected to network 140; end nodes 151 and 152 are connected to network 150; end node 161 is connected to network 160; end node 171 is connected to network 170; end node 181 is connected to network 180; end node 184 is connected to network 183; end node 187 is connected to network 186; and end node 191 is connected to network 190. Bridges 115, 125, 135, 145, and 155 interconnect the different networks. Bridges 115 and 125 interconnect networks 110 and 120; bridge 135 interconnects networks 130 and 140; bridge 145 interconnects networks 120, 150, 160, 180, 190, and 196; and bridge 155 interconnects networks 130, 170, 183, 186, 190, and 196.

In the network topology shown in FIG. 1, several loops already exist. For example, there is a loop involving networks 110 and 120 and bridges 115 and 125, and another loop involving networks 190 and 196 through bridges 145 and 155.

To avoid the problems with loops, a mechanism must be devised either to resolve the loops or to avoid them. One method which has been devised and is described in detail in both the Backes article and the IEEE standard is the spanning tree algorithm. Generally, this algorithm involves ordering the bridges according to some criterion. Then, one bridge connected to each network is chosen as a designated bridge according to the ordering criterion, and only the designated bridge can forward messages to and from the network for which it is a designated bridge. Use of this algorithm thus breaks any loops. The other bridges connected to a network are called daughter bridges, and they forward messages to the designated bridge on only one network.

The spanning tree algorithm in this form, however, creates an additional problem. If messages are forwarded on only one of the trunked networks, congestion may result.

One way to relieve the congestion in networks created by the spanning tree algorithm is to distribute messages from daughter bridges to designated bridges across all of the common networks in a round-robin, or similar algorithm. The problem with this method is that it does not preserve the time sequence of messages.

"Time sequence of messages" refers to the order in which messages are sent from one end node to another end node. Time sequence is important because the data sent between end nodes may be spread across several messages. If the messages are received out of order, the data may be garbled. When using the roundrobin algorithm, the time sequence of messages cannot be guaranteed because messages may have different sizes and be transmitted at different rates which could disrupt the order of their transmission.

Another problem with the round-robin algorithm occurs if end nodes are located on some of the common networks. In such a situation, one cannot guarantee that messages to end nodes on one common network will be delivered if the daughter bridge's roundrobin algorithm routes those messages to a different common network.

It is therefore desirable to relieve congestion in networks, especially with congestion caused due to the use of the spanning tree algorithm. It is also desirable to maintain the time sequence of the messages when relieving the congestion and to ensure that the relief does not degrade network performance in other areas. One of those areas is the transparent operation of the networks in the spanning tree algorithm. Another area is the proper access to all the end nodes.

Additional desirable goals and benefits of the present invention will be set forth in part in the description which follows and in part will be obvious in that description or may be learned by practice of the invention.

SUMMARY OF THE INVENTION

The present invention overcomes the problems of network topology by locating "trunked" networks and distributing messages among those trunked networks without creating loops and maintaining the time sequence of the messages.

To achieve the benefits, and in accordance with the purposes of this invention, as embodied and broadly described herein, the method of this invention is for improving communication among end nodes in a collection of networks connected to a plurality of end nodes and to at least one of a plurality of bridges used to forward messages in a time sequence between the end nodes.

The method comprises the step of selecting one of the bridges connected to each network as a designated bridge for that network to forward messages to and from that network. The remaining bridges connected to that network which are not selected as a designated bridge are deemed daughter bridges.

Another step according to the method of this invention is sensing, by each of the daughter bridges, whether a trunking condition exists for the ones of the networks connected to that daughter bridge. The trunking condition occurs when a plurality of networks, termed trunked networks, are connected to that daughter bridge and to a corresponding one of the designated bridges. The daughter bridges which sense the trunking condition are termed trunked daughter bridges.

The method of this invention also includes the step of executing a binding scheme by a selected one of the trunked daughter bridges. The execution of the binding scheme causes a selected trunked daughter bridge to act as a plurality of daughter bridges each connected to a different one of the trunked networks corresponding to that selected trunked daughter bridge. This operation distributes the messages sent from the selected trunked daughter bridge and to the corresponding designated bridge among the connected trunked networks in a matter which preserves the time sequence of the messages.

The accompanying drawings, which are incorporated herein and which constitute a part of this specification, illustrate an embodiment of a method of this invention and, together with the description, explain the principles of this invention.

DESCRIPTION OF THE PREFERRED EMBODIMENT

Reference will now be made in detail to a presently preferred embodiment of this invention, examples of which are shown in the accompanying figures.

The method of this invention can be performed with the elements of the network shown in FIG. 1 if they are properly configured. As FIG. 1 shows, a collection of networks, 110, 120, 130, 140, 150, 160, 170, 180, 183, 186, 190, and 196 are connected to a plurality of end nodes 111, 112, 121, 122, 131, 132, 141, 142, 151, 152, 161, 171, 181, 184, 187, and 191. Each of the networks is also connected to at least one of the bridges 115, 125, 135, 145, and 155. In accordance with the present invention, those bridges forward messages between the end nodes in a particular time sequence, as described above.

Figure 2:
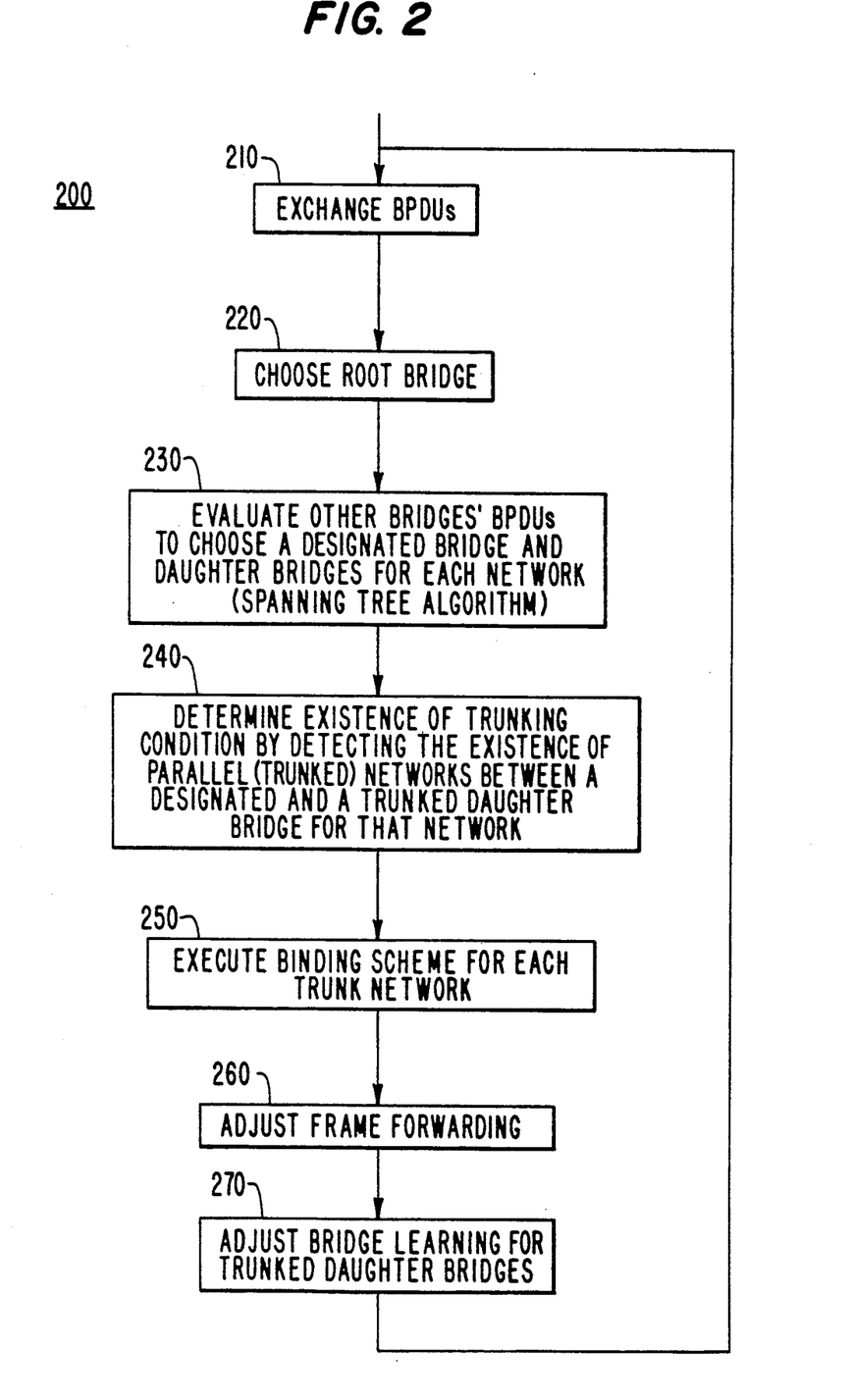
FIG. 2 shows a flow diagram for a preferred process of improving communication among end nodes in a network.

FIG. 2 shows a general flow diagram 200 for a preferred process in accordance with the method of this invention for improving communication among end nodes. In accordance with the present invention, one of the bridges connected to each of the networks is selected as a designated bridge for that network to forward messages to and from that network. The remaining bridges connected to that network which are not selected as a designated bridge are deemed to be daughter bridges.

Flow diagram 200 contains several steps for providing such a selection process according to the spanning tree algorithm. The present invention, however, is not necessarily limited to the use of a spanning tree algorithm, although use of the spanning tree algorithm is preferred.

The spanning tree algorithm requires at a minimum that each bridge have a unique bridge identifier throughout the networks to which the algorithm is applied, and that the ports within each bridge, which are where the bridges connect to the networks, each have a unique identifier within the corresponding bridge. In addition, configuration messages exchanged by the bridges must have addresses which all bridges will receive. Otherwise, the communication among the bridges would become difficult, if not impossible.

Figure 3:
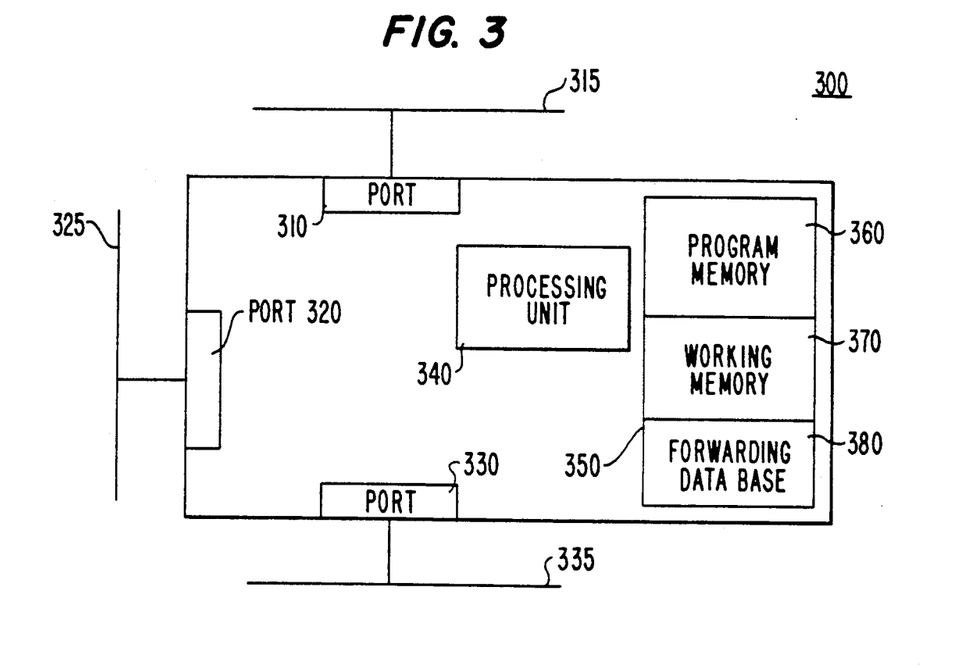
FIG. 3 is a block diagram of the components of a bridge to carry out the method of this invention.

Prior to describing the spanning tree algorithm, it is important to convey an understanding of the bridge architecture because the bridges preferably perform the steps shown in flow diagram 200. A preferred embodiment of a bridge containing the necessary elements to carry out the method of this invention is shown in FIG. 3. Bridge 300, which has a unique identifier, also has ports 310, 320 and 330, each of which are uniquely identified in bridge 300. Bridge ports 310, 320 and 330 are connected respectively to networks 315, 325 and 335.

Bridge 300 also includes a bridge processing unit 340 which is preferably a commercially available microprocessor, but can also be a specially designed unit. The only important feature of bridge processing unit 340 is that it contain sufficient circuitry and capability to perform the logic operations described below. Bridge processing unit 340 can also contain the capability to perform other operations, such as bridge performance evaluation, which are not part of the present invention.

Bridge 300 preferably includes a bridge memory unit 350 which has three portions: program memory 360, working memory 370, and bridge forwarding data base 380. Program memory 360 contains various sequences of instructions which cause bridge processing unit 340 to perform necessary and desired operations. Program memory 360 can either be a ROM, PROM or a RAM, depending upon the design considerations and expected use of program memory 360.

Bridge memory unit 350 also includes a working memory 370, which is preferably a RAM. The purpose of working memory 370 is to construct messages and to provide a means for temporary storage, such as when executing the spanning tree algorithm.

The final portion of bridge memory unit 350 shown in FIG. 3 is bridge forwarding data base 380. Preferably, forwarding data base 380 includes a RAM or a set of registers. The operation and structure of bridge data base 380 is described in detail below, however, the general purpose of data base 380 has already been alluded to. Briefly, data base 380 contains a representation of the topology of the collection of end nodes as seen by bridge 300. When bridge 300 receives a message it consults data base 380 to find the proper port (i.e., network) to use for forwarding the message. Bridge 300 could be constructed from a Translan III bridges manufactured by the Vitalink Communications Corporation, which would then need to be configured and programmed to perform the method of the present invention.

As shown in FIG. 2, the first step in flow diagram 200, which is also part of the spanning tree algorithm, is for the bridges to exchange configuration messages, called "hello" messages or bridge protocol data units (BPDUs) with the other bridges (step 210). The exchange occurs during repeating configuration periods. Such periods are adjustable but can occur, for example, every four (4) seconds. Unlike the end node messages described above, BPDUs are sent between bridges.

In the description of BPDU below, the bridge sending the BPDU is called the "transmitting bridge." The construction and transmission of BPDUs is accomplished by bridge processing unit 350, under the control of program memory 360 and using working memory 370. Each BPDU include several fields shown in FIG. 4 as overhead field 410, root identifier field 420, root path cost field 430, bridge identifier field 440, and port identifier field 450.

Figure 4:
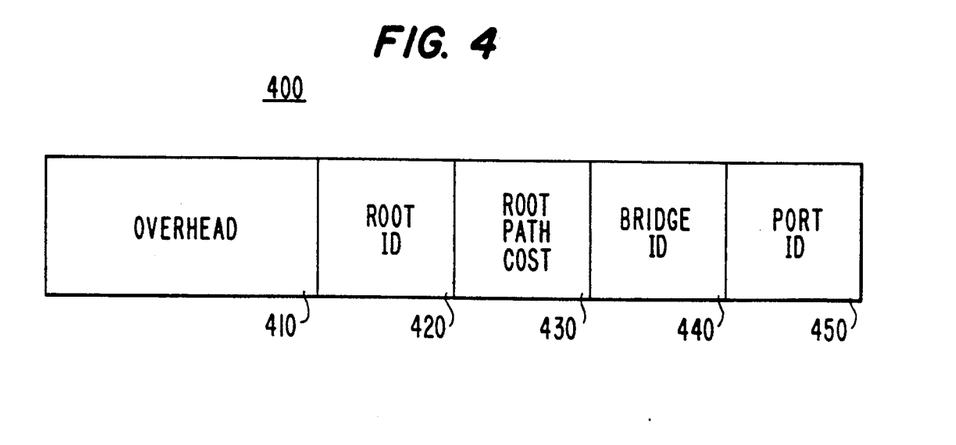
FIG. 4 shows a format for a bridge protocol data unit sent between bridges.

Overhead field 410 includes several portions not relevant to the present invention. For example, overhead field 410 could include indicators of the BPDU type, or certain flags, such as signals of a topology change if a bridge is reconnected. Overhead field 410 could also identify a protocol version or standard, or could include timing, delay or performance information to allow for proper bridge management. A more detailed explanation of such overhead fields may be found in the IEEE standard.

Root identifier field 420 identifies the bridge believed to be the root by the transmitting bridge. The root bridge is a bridge chosen by the other bridges to help in organizing the spanning tree.

Root path cost field 430 contains an indicator of the "costs" of the path from the root bridge to the transmitting bridge. The root path cost is often calculated by tallying values for the networks through which a message must pass between the root bridge and the transmitting bridge. One way of determining root path costs is for a bridge to receive a BPDU from a bridge closer to the root, add to the path root cost in that BPDU a stored value representing the "cost" of the network from which that BPDU was received. The sum is the root path cost for the BPDUs which the bridge then transmits. Preferably, each bridge has stored values for network costs in memory 350, and those stored values correspond to the ports through which messages are received.

Bridge identifier field 440 contains the unique bridge identifier described above. Port identifier field 450 contains the unique identifer of the port of the transmitting bridge through which BPDU 400 was transmitted.

The next step in flow diagram 200 is also part of the spanning three algorithm and involves choosing the root bridge (step 220). The root bridge is important in the spanning tree algorithm so that designated bridges may be selected.

One way to chose the root bridge, for example, is to have the unique bridge identifiers include a priority field and an additional field which preserves uniqueness in cases of shared priority. The priority can be set in a number of ways to reflect design or operational concerns. The root bridge would be the bridge with the best priority. If more than one bridge has the best priority, then the additional field is used.

Preferably, the selection of the root bridge would be done by the bridges themselves using bridge processor 340 under control of program memory 360 and with the aid of working memory 370. A preferred method of selection calls for each bridge to compare the root identifier field 420 of the BDPUs it receives to a stored root identifier. If the received message has a root identifier field with a better priority than the stored root identifier, the root identifier value in the received message would become the new stored root identifier. With this method, all bridges will eventually have the same stored root identifier.

As shown in FIG. 2, the next step is to evaluate the BPDUs from the other bridges to choose a designated bridge and daughter bridges for each network (step 230). This too is part of the spanning tree algorithm. In the preferred embodiment of this invention, such evaluation is done by each bridge using the appropriate bridge processing unit 340 under control of program memory 360 and working memory 370.

Preferably, while the bridges are exchanging BPDU's, all bridges connected to the same network compare root path costs, which are concurrently being determined in a manner described above. The bridge with the lowest root path cost is deemed to be the designated bridge for that network. If multiple bridges have the same root path cost, then some technique, such as use of the bridge identifier is used to select the designated bridge. All of the bridges connected to a network which do not have another path to the root, and are not selected to be a designated bridge are deemed to be daughter bridges.

According to one variation of this invention, this selecting step involves exchanging configuration messages, such as BPDUs, among the bridges during the repeating configuration periods, as described with regard to step 210.

In accordance with the method of this invention, each of the daughter bridges senses whether a trunking condition exists for the networks which are connected to that daughter bridge. The trunking condition occurs when a plurality of networks, termed trunked networks, are connected both to a particular daughter bridge and to a corresponding designated bridge for those same networks. For example, in FIG. 1, networks 190 and 196 are trunked networks. The daughter bridges sensing the trunking condition are termed "trunked daughter bridges."

Figure 5:
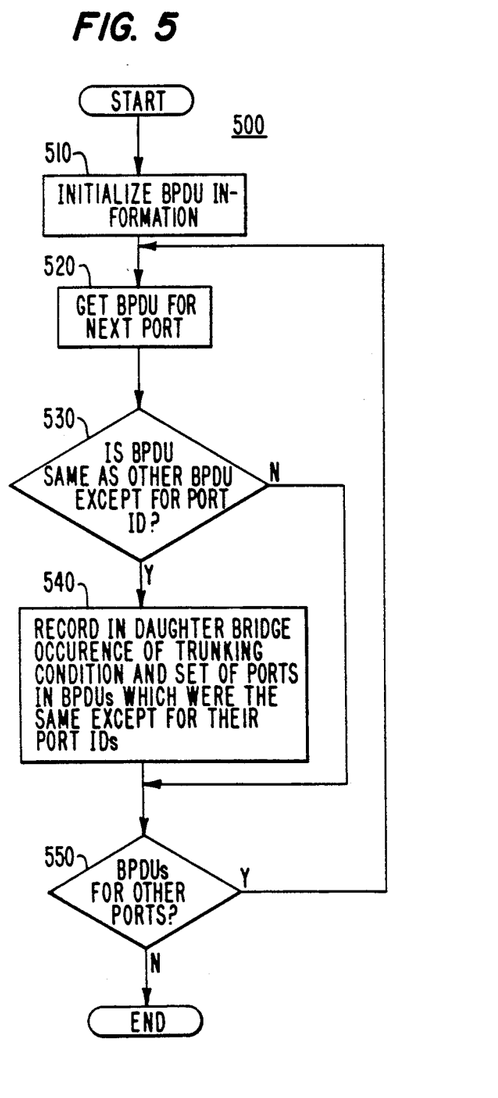
FIG. 5 shows a flow diagram for a preferred process of determining the existence of a trunking condition shown in step 240 of FIG. 2.

In the flow diagram shown in FIG. 2, the existence of trunking condition is determined by detecting the existence of parallel networks between a designated and a trunked daughter bridge for that network (step 240). Flow diagram 500 in FIG. 5 shows specific steps in the preferred implementation of this method for determining the existence of a trunking condition. Preferably, each of the daughter bridges performs the steps shown in flow diagram 500 with bridge processing unit 340 under the control of the program memory 360 and using working memory 370.

The first step in flow diagram 500 is the initialization by each daughter bridge of its BPDU information at the beginning of a configuration period (step 510). This allows a complete procedure to take place each configuration period.

In accordance with one variation of the present invention, the method of improving communication among end nodes includes the comparison of the BPDUs received by each of the daughter bridges to find occurrences of multiple configuration messages received during the same configuration period, which messages differ only in the port identifier portion. The configuration messages should include a port identification portion specifying a code for the port from which the corresponding message is transferred. Preferably, this step is carried out by including port identifiers in the BPDUs, as FIG. 4 shows with identifier 450 in BPDU 400. The occurrences of such multiple configuration messages indicates the existence of a trunking condition because receipt of such messages shows that the message traveled from the same source through parallel networks.

As shown by flow diagram 500 in FIG. 5, such comparison is preferably carried out in several steps. First, the BPDU for the next port is examined (step 520). Next, a comparison is made between that BPDU and the other BPDUs which had been previously examined (step 530).

If the only difference in BPDUs is the port identifier fields, the daughter bridge records the occurrence of a trunking condition and groups into the same "trunking group" those ports which received the BPDUs that differ only in the port identifiers (step 540). This procedure is continued for all BPDUs and all the ports (step 550). Preferably, the entire procedure in FIG. 5 is repeated each configuration period.

Also in accordance with the present invention of a method for improving communication among end nodes is the step of executing a binding scheme by a selected one the trunked daughter bridges. The binding scheme causes that trunked daughter bridge to act as a plurality of daughter bridges each of which is connected to a different one of the trunked networks corresponding to that selected trunk daughter bridge. In this way, messages forwarded between the selected trunked daughter bridge and the corresponding designated bridge are distributed among the connected trunked networks in a matter which also preserves the time sequence of the messages. Each of the trunked daughter bridges can also execute its own binding scheme, as indicated in step 250 of the flow diagram 200 in FIG. 2.

Figure 6:
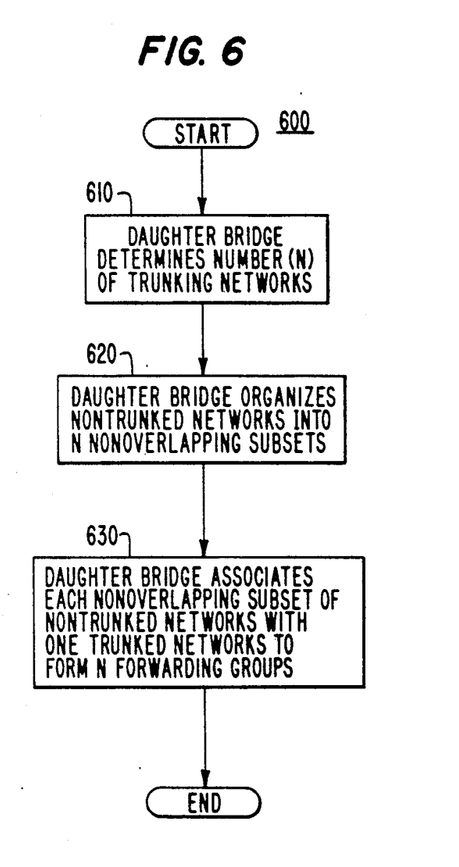
FIG. 6 shows a flow diagram for a preferred process of executing a binding scheme shown in step 250 of flow diagram 200 in FIG. 2.

A more detailed explanation of the substeps for executing the binding scheme is shown in flow diagram 600 in FIG. 6. Although the operations in flow diagram 600 are described for a single daughter bridge, those operations would preferably be performed for all of the trunked daughter bridges.

In accordance with an aspect of the present invention, executing the binding scheme could involve first organizing the selected trunked daughter bridge into a first number, e.g., N, of forwarding groups, where N is equal to the number of networks in the corresponding set of trunked networks. Thus, if a trunking condition were determined to have five networks connected between a particular daughter bridge and a particular designated bridge, then N would be set equal to five.

Figure 7:
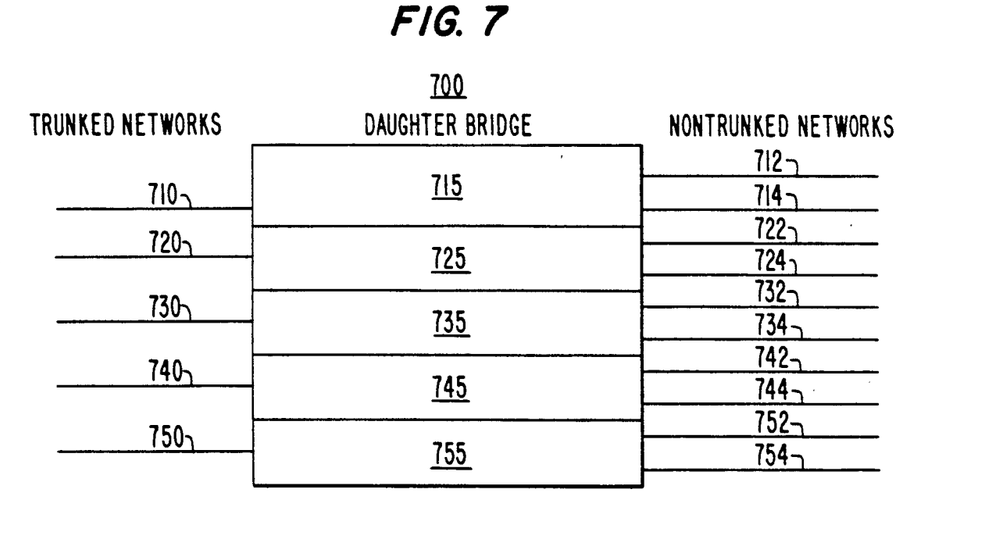
FIG. 7 shows an example of a daughter bridge coupled to trunked and nontrunked networks.

FIG. 7 shows a daughter bridge 700 connected to five trunked networks 710, 720, 730, 740 and 750. The forwarding groups are shown as 715, 725, 735, 745 and 755.

In flow diagram 600, the daughter bridge first determines the number of trunked networks (step 610). Preferably, the bridge would execute the steps in flow chart 600 using a bridge processing unit 340 under control of program memory 360, and might also make use of working memory 370.

The next substep in executing a binding scheme is collecting the ones of the networks, termed "nontrunked networks," which are connected to the selected trunked daughter bridge but which are not in the set of corresponding trunked networks, into the first number of substantially equal-size, nonoverlapping subsets of nontrunked networks. An important step in such collection is the selected daughter bridge's organization of the nontrunked networks into N nonoverlapping subsets (step 620).

As an example, if, as shown in FIG. 7, daughter bridge 700 were connected to the five trunked networks 710, 720, 730, 740, 750, as well as ten nontrunked networks 712, 714, 722, 724, 732, 734, 742, 744 and 752 and 754, the nontrunked networks would be organized into five subsets of two nontrunked networks each.

The last substep of executing the binding scheme in accordance with one method of the present invention is to associate each of the forwarding groups with a different one of the corresponding trunked networks and a different one of the nonoverlapping subsets of nontrunked networks. In such an association, the daughter bridge would form N forwarding groups each comprising one trunked network and one or more nontrunked networks (step 630).

The purpose of the forwarding groups is to allow the daughter bridge to forward messages to the designated bridge as if each of the forwarding groups were a separate daughter bridge. This avoids the problem of congestion when all of the messages are transferred down one of the trunked networks and, as will become clearer below, preserves transmission of the messages being in the original time sequence.

As shown in FIG. 7, daughter bridge 700, using bridge processing unit 340 under control of program memory 360 and with memory 370, forms forwarding groups 715, 725, 735, 745, and 755 such that: forwarding group 715 includes trunked network 710 and nontrunked networks 712 and 714; forwarding group 725 includes trunked network 720 and nontrunked networks 722 and 724; forwarding group 735 includes trunked network 730 and nontrunked networks 732 and 734; forwarding group 745 includes trunked network 740 and nontrunked networks 742 and 744; and forwarding group 755 includes trunked network 750 and nontrunked networks 752 and 754.

Figure 9:
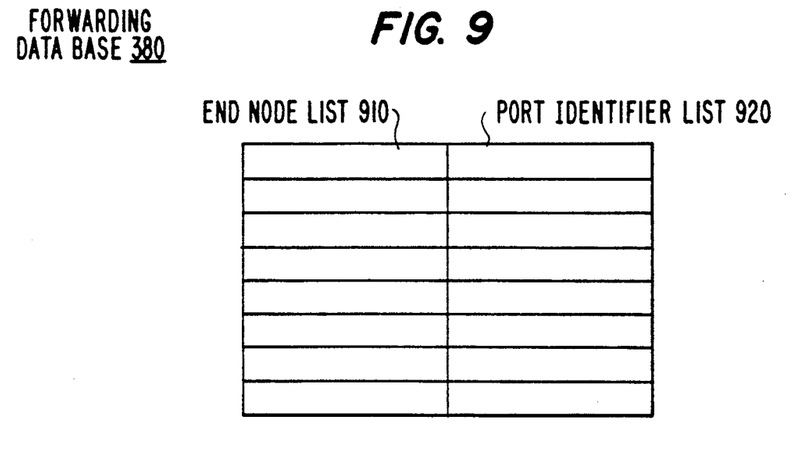
FIG. 9 shows a block diagram for forwarding data base 380 shown in FIG. 3.

The association of each forwarding group with a different trunked network and nonoverlapping subset of nontrunked networks can include other steps. One such step involves some initial correspondence between the end nodes connected to each subset of nontrunked networks and the trunked networks associated with the same forwarding group as that subset. This step assists in the message or frame forwarding operations carried out by the bridge. Preferably such correspondence involves use of a table, shown below, in forwarding data base 380 which can be set up either automatically or manually.

Figure 8:
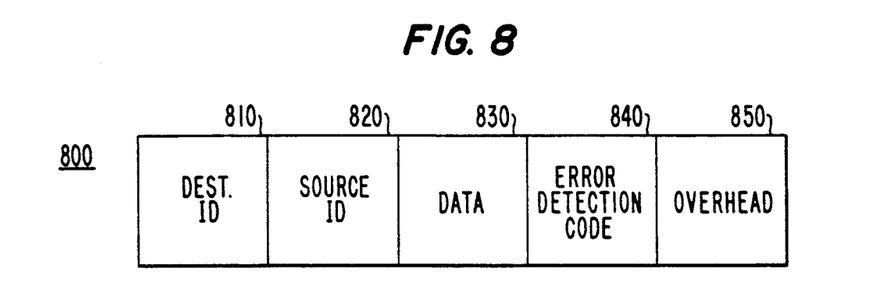
FIG. 8 shows a format for messages to be sent between end nodes on a network.

FIG. 8 shows a format of a message 800 which is typical of the messages sent between end nodes on a networks or a set of networks as shown in FIG. 1. Message 800 includes a destination identifier 810, a source identifier 820, data 830, an error detection code 840, and overhead 850. Each bridge examines the destination identifier 810 of message 800 to decide whether to forward or discard the message. Preferably, the bridge makes this determination after consulting forwarding data base 380.

FIG. 9 shows an example of forwarding data base 380. In FIG. 9, data base 380 includes an end node list 910 and a port identifer list 920. End node list 910 contains unique identifiers for each end node about which the particular bridge is aware. Port identifier list 920 indicates the part, and therefore the network, to which any messages for the corresponding end node in list 910 should be forwarded.

Thus, each time a bridge receives a message it consults forwarding data base 380 using the bridge processing unit 340 and the program memory 360. If the bridge matches the destination identifier field 810 with an entry in end node list 910, the message is forwarded out the port identified in the corresponding entry in port identifier list 920. If no match was found, the bridge forwards the message to all networks in the forwarding group except for the network on which the message was received.

To make sure that changes in networks are periodically reflected, and to note, the failure of bridges on the networks, many bridges use a time-out provision which causes the bridges to erase their forwarding data bases periodically, preferably during each configuration period or "hello" time. Thus, in each configuration period, not only would a root be chosen and designated bridges be determined, but the bridge learning techniques would start anew with a clear forwarding data base.

The binding scheme just described not only relieves congestions, but maintains a loop avoidance of the spanning tree algorithm. The binding scheme relieves congestion because communications between one of the daughter bridges and the corresponding designated bridges will now occur along each of the trunked networks. Before the binding scheme is executed, all of the messages into the daughter bridge would be forwarded to the designated bridge over only a single trunked network. After the binding scheme, the messages from the nontrunked networks will be forwarded to the designated bridge over the trunked network which is in the same forwarding group as the nontrunked network from which the message was received.

Loops are still avoided because messages sent from the designated bridge to the daughter bridge on a trunked network are never forwarded to another trunked network, or to a nontrunked network which is not part of the forwarding group associated with the trunked network on which the message was received. For all messages received or transmitted on a trunked network by the daughter bridge, and, as explained below, for messages with an unknown destination identifier or a destination identifier for a group of end nodes received by the daughter bridge on any network, the daughter bridge forwards such messages as though it was N daughter bridges.

The only time the daughter bridge forwards messages between forwarding groups is when a message received on a nontrunked network has a destination identifier field 810 which is known to be reachable through another nontrunked network. In this case, the daughter bridge forwards the message onto the nontrunked network with which the destination identifier field is associated in the forwarding data base. Looping cannot occur even in this case, however, because the message is never forwarded to the designated bridge. Thus, it is assured that the message will not appear again on a different trunked network. Furthermore, because each forwarding group in the daughter bridge shares the same forwarding data base 380, it is assured that each forwarding group has a consistent view of the ports for nontrunked networks through which certain end nodes are reachable.

In addition, the time sequence of messages are maintained because all of the messages from a particular end node to another end node which are forwarded by the designated bridge will still proceed over the same trunked networks. The only difference which the binding scheme effects is that messages from addressed to a specific end node and those addressed to a group of end nodes from a particular end node may not be transmitted over the same network, and thus may not arrive in the same order in which they were sent. The sequence of messages from different address, however, is not critical to network performance. In addition, the method is transparent to the end nodes because it takes place entirely within the bridges, so the end nodes need not be aware of the network reorganization.

Before the binding scheme was executed, the daughter bridge had a simple forwarding data base. All the end nodes reached through the trunked networks had only one port identifier because the spanning tree algorithm specifies that in trunking conditions, daughter bridges should communicate with the corresponding designated bridges over only one network. After the binding scheme is executed, however, communication will occur over several trunked networks. Therefore, port identifier list 920 must be updated for such entries to reflect the trunked networks for each forwarding group.

Figure 10:
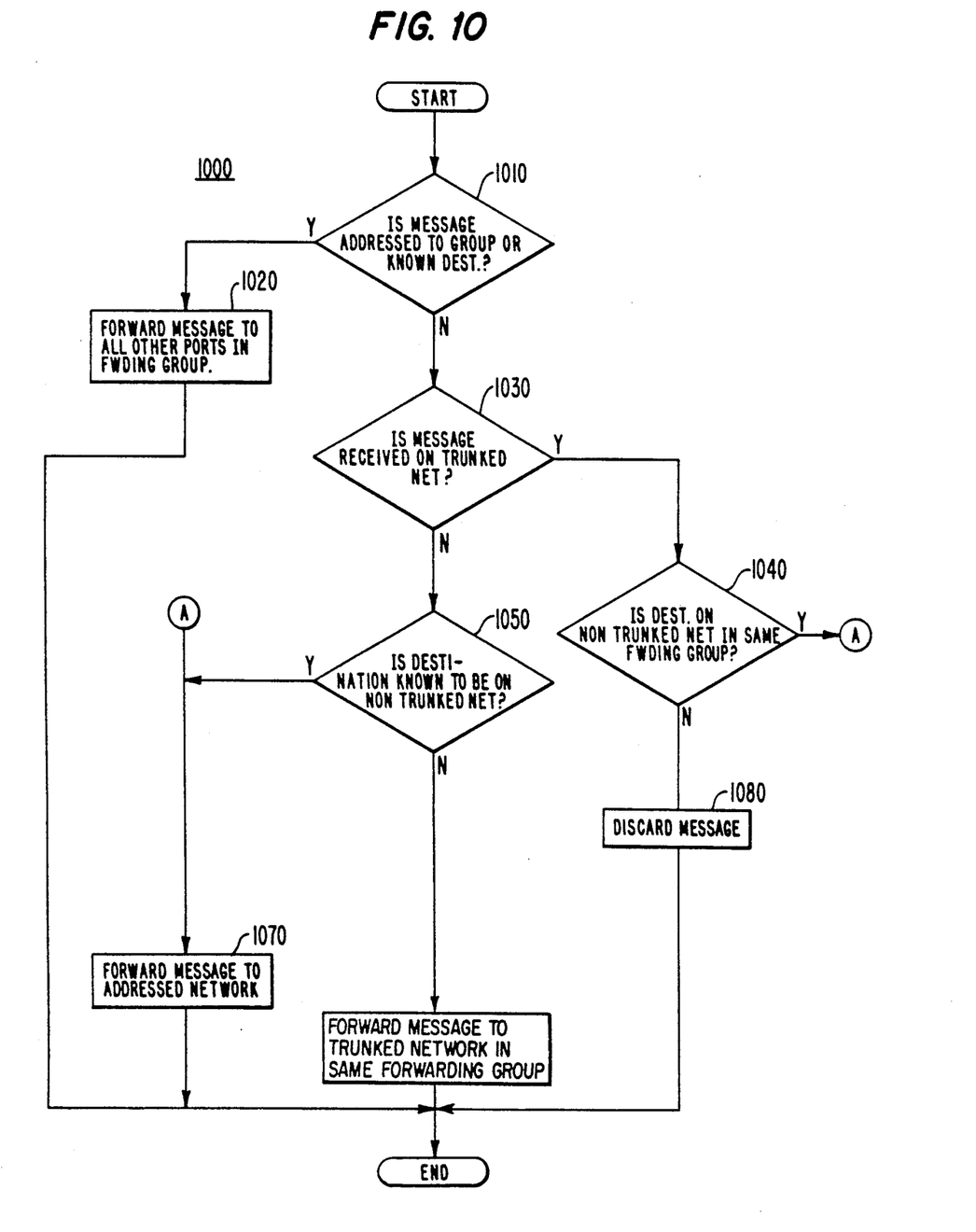
FIG. 10 shows a flow diagram for a preferred process of adjusting the frame forwarding by bridges in accordance with step 260 of FIG. 2.

With the method of this invention, the bridges' normal message or frame forwarding techniques, as well as the learning techniques should be modified. In the flow diagram 200 shown in FIG. 2, the adjustment to message or frame forwarding is shown in step 260. FIG. 10 contains a detailed flow diagram 1000 for carrying out the frame forwarding adjustment.

In the particular implementation shown in FIG. 10, such forwarding involves first determining whether a message from any network has a destination address for a group of end nodes, or has an unknown address (step 1010). If so, then the message received by a daughter bridge in a forwarding group is forwarded to all of the other networks in that forwarding group (step 1020).

If a message was not addressed to a group and had a known destination address, the next determination is whether the message was received on a trunked network (step 1030).

If it was, then the port number associated with the destination identifier in forwarding data base 380 should be checked to see if it was in a non-trunked network from the same forwarding group as the trunked network on which the message was received (step 1040). If not, then the message would be discarded (step 1080). Otherwise, the message would be forwarded to the port associated with the destination identifier in forwarding data base 380 (step 1070).

If a message with a known address was received on a nontrunked network, then the port associated with the destination identifier in forwarding data base 380 would be checked to see if it was also a nontrunked network (step 1050). If the port associated with the known destination identifier in forwarding data base 380 is for a nontrunked network, and the message was received on a nontrunked network, then the message is forwarded to the port associated with the destination identifier in forwarding data base 380 (step 1070). If the port associated with the destination identifier in forwarding data base 280 is a trunked network, then it is forwarded over the trunked network in the same forwarding group.

Bridge forwarding after execution of the binding scheme is not the same as before execution of the binding scheme. For example, if a message from a nontrunked network is received in a particular forwarding group, and the destination address of that message is unknown, then that message is sent to all of the networks in the particular forwarding group, not to all of the networks in the daughter bridge. This is normally not a problem because the message with the unknown destination identifier will be sent over the trunked network to the designated bridge. The designated bridge will, if it is also unaware of the destination address, send the message back over the other trunked networks and eventually to all of the nontrunked networks which are not in the forwarding group of the nontrunked network originally carrying the message to the daughter bridge.

Figure 11:
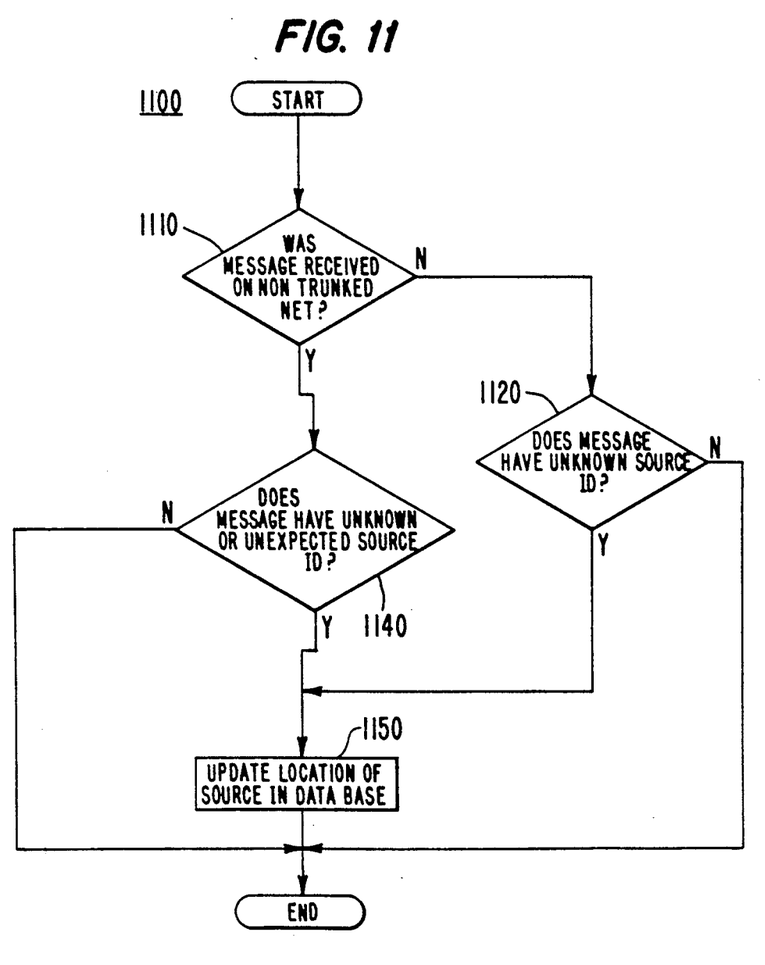
FIG. 11 shows a flow diagram for a preferred process of adjusting the bridge learning techniques in accordance with step 270 of flow diagram 200 in FIG. 2.

The final step of flow diagram 200 in FIG. 2 is to adjust bridge learning for the trunked daughter bridges (step 270). FIG. 11 contains a detailed flow diagram 1100 to explain a method of adjusting bridge learning in accordance with this invention.

In accordance with certain methods of the invention, the daughter bridge monitors messages forwarded by the corresponding designated bridge. The daughter bridge then updates the table to correspond the end nodes with the trunked networks if the addresses of the end nodes were previously unknown.

As shown in FIG. 11, the updating preferably involves determining initially whether the message was received on a nontrunked network (step 1110). If not, meaning the message was received on a trunked network, the source identifier is checked to see whether it is contained in forwarding data base 380 (step 1120). If the source identifier is unknown, then forwarding data base 380 is updated with the location of the source identifier (step 1150). Otherwise, no update should occur because the source may have already been learned from a nontrunked network.

If the message was received on a nontrunked network, the source identification is checked against the information in forwarding data base 380 to see whether the information is different from that in data base 380, or if the source identification is unknown (step 1140). If either condition is met, then forwarding data base 380 is updated with the location of the source identification (step 1150).

Before this invention, a daughter bridge could update a forwarding data base with information about the location of both unknown and known end nodes even if this information was ascertained by observing messages received from the designated bridge. According to the present invention, a trunked daughter bridge can update forwarding data base 280 with new information about previously known or previously unknown end nodes only if that information is ascertained by observing messages received on nontrunked networks. The only information which can be ascertained from trunked networks concerns previously unknown end nodes.

It will be apparent to those skilled in the art that modifications and variations can be made in the method of improving communication of this invention. The invention in its broader aspects is therefore not limited to the specific details, representive methods and apparatus, and illustrative examples shown and described in the specification. Departure may be made from such details without departing from the spirit or scope of the general inventive concept.

What is claimed is:

1. In a collection of networks connected to a plurality of end nodes and to at least one of a plurality of bridges, said bridges being used for forwarding messages in a time sequence between end nodes connected to different ones of said networks, a method for improving communication among said end nodes comprising the steps of:

selecting one of said bridges connected to each of said networks as a designated bridge for that network to forward messages to and from that network, wherein the remaining ones of said bridges connected to that network and not selected as said designated bridge are deemed daughter bridges;

sensing, by each of said daughter bridges, whether a trunking condition exists in the ones of said networks connected to that daughter bridge, said trunking condition occurring when a plurality of said networks, termed trunked networks, are connected to both that daughter bridge and to a corresponding one of said designated bridges, wherein the ones of said daughter bridges sensing said trunking condition are termed trunked daughter bridges; and executing a binding scheme by a selected one of said trunked daughter bridges to cause said selected trunked daughter bridge to forward messages to and from said designated bridge in the same manner as would a plurality of daughter bridges each connected to a different one of the trunked networks corresponding to said selected trunked daughter bridge, thereby distributing the messages forwarded between said selected trunked daughter bridge and said corresponding designated bridge among said connected trunked networks in a manner which preserves the time sequence of said messages.

2. The method of claim 1 wherein said step of executing said binding scheme includes the substeps of executing said binding scheme for each of said trunked daughter bridges.

3. The method of claim 1 wherein said step of executing said binding scheme includes the substeps of organizing said selected trunked daughter bridge as a first number of forwarding groups, said first number being equal to the number of said trunked networks connected to said selected trunked daughter bridge;

collecting the ones of said networks connected to said selected trunked daughter bridge which are nontrunked networks for that daughter bridge into said first number of substantially equal-size, nonoverlapping subsets of nontrunked networks; and associating each of said forwarding groups with a different one of said connected trunked networks and a different one of said nonoverlapping subsets of said nontrunked networks, such that each message forwarded to the corresponding designated bridge from the nontrunked networks is forwarded via the one of the connected trunked networks associated with the same forwarding groups as is associated with the nontrunked network from which the message was received.

4. The method of claim 3 wherein said messages each include destination portions identifying one of said end nodes as a destination for that message, wherein said selected trunked daughter bridge includes a data base containing certain of said end nodes, referred to as known end nodes, and the ones of said trunked or nontrunked networks associated with each of said known end nodes, and wherein the method includes the substeps, executed by said selected trunked daughter bridge, of forwarding the ones of said messages having destination portions identifying known end nodes, referred to as known destination messages, to the ones of the networks associated with the corresponding known end nodes, and forwarding the ones of said messages which contain destination portions not identifying known end nodes, referred to as unknown destination messages, to all of said networks in the forwarding groups associated with the networks on which said unknown destination messages are received.

5. The method of claim 4 wherein, for each of said known destination messages, an input network for that message is the one of said networks from which said selected trunked daughter bridge receives that message and an output network for that message is the one of said networks associated by said data base with the end node identified with the destination portion of that message, and wherein said step of forwarding said known destination messages includes the substeps of forwarding each of said known destination messages to the output networks for the ones of said known destination messages for which the input networks are trunked networks associated with the ones of said forwarding groups which are also associated with the output networks for those messages; and discarding each of said known destination messages for which the input network which is not associated with the same one of said forwarding groups is also associated with the output network for that message.

6. The method of claim 5 wherein said step of forwarding said known destination messages includes the substeps of forwarding each of said known destination messages to the output networks for the ones of the known destination messages which are either known to be on nontrunked networks or are on trunked networks associated with the forwarding groups also associated with the input networks for said known destination messages.

7. The method of claim 3 wherein said corresponding designated bridge contains a table containing first ones of said end nodes as corresponding to one of said trunked networks connected to said selected trunked daughter bridge, wherein each of said first end nodes connected to one of said nontrunked networks in one of said subsets is associated with the one of said forwarding groups associated with that subset, and the remaining one of said first end nodes are each associated with a unique one of said forwarding groups;

wherein said associating step includes the substep of initially corresponding all of said first end nodes with one of said trunked networks; and wherein said method also includes the steps of
monitoring the messages forwarded by said corresponding designated bridge, and
updating said table by said corresponding designated bridge according to the monitored messages to correspond each of said first end nodes with the one of said trunked networks associated with the same one of said forwarding groups associated with that first end node.

8. The method of claim 4 further including the step of forwarding the ones of the messages which contain destination portions identifying groups of nodes, referred to as multicast messages, to all of the networks in the forwarding groups associated with the networks on which the multicast messages are received.

9. The method of claim 8 wherein for each of said known destination messages, an input network for that message is the one of said networks from which said selected trunked daughter bridge receives that message and an output network for that message is the one of said networks associated by said data base with the end node identified with the destination portion of that message, and
wherein said step of forwarding said known destination messages includes the substeps of
forwarding each of said known destination messages to the output networks for the ones of said known destination messages for which the input networks are trunked networks associated with the ones of said forwarding groups which are also associated with the output networks for those messages; and
discarding each of said known destination messages for which the input network which is not associated with the same one of said forwarding groups is also associated with the output network for that message.

10. The method of claim 9 wherein said step of forwarding said known destination messages includes the substeps of
forwarding each of said known destination messages to the output networks for the ones of the known destination messages which are either known to be on nontrunked networks.

11. The method of claim 1 wherein said step of designating a designated bridge for each of said networks includes the substeps of
selecting one of said bridges to be a root bridge according to configuration messages sent among said bridges;
determining a path value for each of said bridges according to the number of said networks between each of the bridges and the root bridge; and
selecting one of said bridges connected to each network with the lowest path value, to be the designated bridge for that network.

12. The method of claim 1 wherein each of said bridges is connected to said networks by a port having a unique identification code;
wherein the step of selecting designated bridges includes the substep of
exchanging configuration messages among said bridges during a succession of repeating configuration periods, said configuration messages each including a port identification portion specifying the identification code for the port from which the corresponding message is transmitted; and
wherein the step of sensing the existence of a trunking condition includes the substep of
comparing the configuration messages received by each of said daughter bridges to find occurrences of multiple configuration messages received on different networks during the same ones of said configuration periods which differ only in the port identification portions, such occurrences indicating the existence of said trunking conditions.

13. In a collection of networks also connected to a plurality of end nodes, a bridge connected to said network and in communication with other ones of said bridges each connected to ones of said networks for forwarding messages in a time sequence between end nodes connected to different ones of said networks, said bridge comprising:
a plurality of ports, each providing an interface between said bridge and a different one of said networks connected to said bridge;
a program memory containing programs for said bridge;
a data base containing certain known ones of said end nodes and the ones of said ports connected to networks corresponding to each of said known end nodes; and
processor means, coupled to said plurality of ports to said data base and to said program memory, for, in response to said programs in said program memory,
forwarding messages to the ones of said end nodes identified in said messages by accessing said data base to locate the ports connected to the ones of said networks corresponding to the known ones of said end nodes;
selecting either said bridge or one of said other bridges connected to each of said networks as a designated bridge for that network to forward messages to and from that network, wherein the remaining ones of said bridges connected to that network and not selected as said designated bridge are deemed daughter bridges,
sensing, if said bridge is a daughter bridge, whether a trunking condition exists in the ones of said networks connected to said bridge, said trunking condition occurring when a plurality of said networks, termed trunked networks, are connected to both said bridge and to a corresponding one of said other bridges which is a designated bridge, and
executing a binding scheme by said bridge if it senses a trunking condition, said binding scheme causing said bridge to forward messages to and from said designated bridge in the same manner as would a plurality of bridges each connected to a different one of the trunked networks connected to said bridge, thereby distributing the messages forwarded between said bridge and said designated bridge among said connected trunked networks in a manner which preserves the time sequence of said messages.

* * * * *